United States Patent
Nguyen et al.

(10) Patent No.: US 6,366,069 B1
(45) Date of Patent: Apr. 2, 2002

(54) HYSTERETIC-MODE MULTI-PHASE SWITCHING REGULATOR

(75) Inventors: Don J. Nguyen, Portland; Thovane Solivan, Hillsboro, both of OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/775,855

(22) Filed: Feb. 1, 2001

(51) Int. Cl.$^7$ ................................................. G05F 1/40
(52) U.S. Cl. ........................................ 323/282; 323/272
(58) Field of Search ............................... 323/266, 268, 323/271, 272, 282, 283, 284; 363/65, 69, 70

(56) References Cited

U.S. PATENT DOCUMENTS 5,872,479 A * 2/1999 Shin .......................... 327/537
6,043,634 A    3/2000 Nguyen et al.
6,069,471 A    5/2000 Nguyen
6,100,676 A * 8/2000 Burstein et al. ............ 323/283

* cited by examiner

Primary Examiner—Matthew Nguyen
(74) Attorney, Agent, or Firm—Blakely, Sokoloff, Taylor & Zafman LLP

(57) ABSTRACT

A switching regulator has a number of switchable power circuits, a number of inductive elements each being in series with a respective power circuit, and a number of resistors each being in series between a respective inductive element and a common node. A hysteretic comparator circuit has a first input coupled to the common node, and an output coupled to control the switchable power circuits. A number of sampling circuits each being coupled to provide a resistor voltage of a respective resistor as an input to the hysteretic comparator circuit is also provided. The hysteretic comparator circuit responds to each pair of resistor and common node voltages using the same hysteresis thresholds.

17 Claims, 5 Drawing Sheets

HYSTERETIC-MODE MULTI-PHASE SWITCHING REGULATOR

BACKGROUND

This invention is generally related to switching dc voltage regulators, and more particularly to techniques for distributing an output current of a buck-type switching regulator equally among two or more phases of the regulator.

A dc voltage regulator converts an input dc voltage to either a higher or a lower dc output voltage. Such voltage regulators allow an electronic system to support components that are powered by different supply voltages, which helps control power consumption in the overall system. One type of voltage regulator is a switching regulator that is often chosen due to its small size and greater power efficiency. In a buck-type switching regulator, a solid-state switch is rapidly closed and opened to transfer energy between an input power supply (which may be unregulated) and an inductive element such as a stand-alone inductor or part of a transformer. The inductive element in turn typically feeds a common node to which another energy storage or filter circuit, such as a bulk capacitor, is connected. The switching causes an unavoidable ripple in the output current and the output voltage at the common node. The capacitor helps reduce this ripple, in an effort to obtain an essentially dc voltage. Note that the switching is controlled in response to feedback from the common node, in a manner that yields a desired voltage at the common node.

In a multi-phase regulator, multiple phases are provided to increase the available output current of the switching regulator. Each phase may be viewed as having a switchable solid-state power circuit that feeds an inductive element which in turns feeds the common node. A controller is provided that is able to correctly time the activation and deactivation of each phase, i.e. the closing and opening of the solid state switch in each phase, relative to the others, so that the desired voltage appears at the common node.

To improve the efficiency and reliability of the multi-phase regulator, the average output current at the common node should be distributed or shared equally among all of the phases. One limited solution for equally distributing the output current is to measure the current in each phase, sum these measured currents to yield an estimate of the output current, divide this sum by the number of phases to get the desired current in each phase, and then adjust the activation/deactivation of each phase to counteract the difference between the measured current and the desired current in that phase. Such a technique, however, may be too costly to implement in certain consumer products such as desktop and portable computers and servers.

BRIEF DESCRIPTION OF THE DRAWINGS

The invention is illustrated by way of example and not by way of limitation in the figures of the accompanying drawings in which like references indicate similar elements. It should be noted that references to "an" embodiment in this disclosure are not necessarily to the same embodiment, and they mean at least one.

DETAILED DESCRIPTION

According to an embodiment of the invention, a method in a multi-phase switching dc regulator is disclosed that features a more cost-effective yet reliable technique for equally distributing the output current among the phases. The regulator features an output current being defined at a common node as a sum of a number of phase currents, where each phase has an inductive element and a resistor in series between the inductive element and the common node. The output current is equally distributed among the phases, by hysteretically comparing a voltage of each resistor to a voltage of the common node using the same hysteresis thresholds and, in response, controlling the activating and de-activating of the phases. In one embodiment, a two state result of the comparison (high or low) determines the transitions of a pulse width modulated digital signal from which the proper timing for control signals that are applied to activate/de-activate each phase can be derived in a convenient manner using simple logic gates. The encoding of the two state comparison result may, if so desired, be accomplished using techniques other than pulse width modulation.

Figure 1:
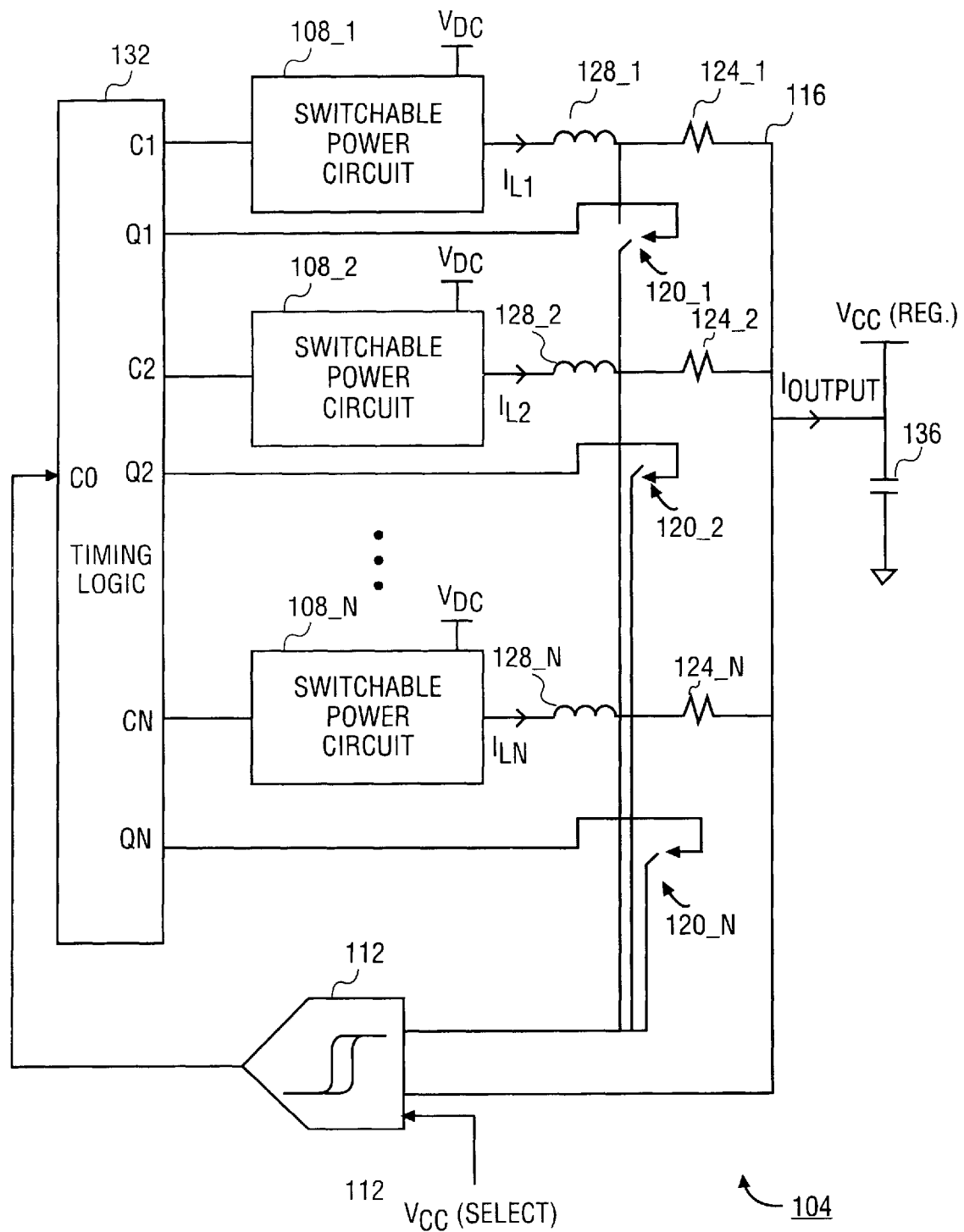
FIG. 1 shows a block diagram of a switching regulator according to an embodiment of the invention.

FIG. 1 shows a block diagram of a switching regulator 104 according to an embodiment of the invention. The switching regulator 104 is based on a number of switchable power circuits 108_1, 108_2, ... 108_N(108), each being part of a separate phase of the regulator. In the same way, a number of inductive elements 128_1, 128_2, ... 128_N (128) are also provided, where each inductor is in series with its corresponding switchable power circuit. A number of resistors 124_1, 124_2 ... 124_N(124) are also provided, where each resistor is in series between a respective one of the switchable power circuits and a common node 116. The resistor 124 acts as a current sense resistor and should accordingly be selected for such a purpose as well as for purposes of providing a voltage to be compared to a voltage of the common node 116, as will be further described below.

Each switchable power circuit 108 is activated in response to an input control signal being asserted thereby causing current to be sourced selectively, i.e. in an on-off manner, from a supply node having a voltage $V_{dc}$. The voltage $V_{dc}$ may be unregulated and/or may be variable. The switching regulator 104 when designed properly will be able to provide a regulated output voltage, such as $V_{cc}$ at the common node 116, regardless of variation in the input supply voltage $V_{dc}$ of each phase.

A hysteretic comparator circuit 112 is provided with a first input coupled to the common node 116 and an output coupled to control the switchable power circuits 108. In the embodiment shown in FIG. 1, this control is achieved using a pulse width modulated signal (called CO) that is fed to timing logic 132 which in turn derives separate control signals C1, C2, ... CN for activating/deactivating each of the switchable power circuits 108. As mentioned above, the invention is not limited to the pulse width modulated signal CO that is fed to timing logic 132, but rather may be implemented using other techniques for encoding the two state output of the hysteretic comparator circuit 112 for purposes of controlling the switchable power circuits 108.

The hysteretic comparator circuit 112 has a second input which sequentially receives the resistor voltage (on the inductor side) from each resistor 124. The comparator circuit 112 responds to each pair of resistor and common node voltages at its inputs by comparing each pair of signals using the same hysteresis thresholds. In addition, the comparison is affected by the $V_{cc(sewlect)}$ input which helps set the value of the regulated output voltage $V_{cc(reg.)}$. Such a closed loop control system in effect allows the average current in each phase to be equal to a preset value and at the same time maintain a constant output voltage $V_{cc(reg.)}$ across a wide range of loads and input supply voltages. An explanation for such a result may be provided using the timing diagram of FIG. 2 as described further below.

A number of sampling circuits 120_1, 120_2 ... 120_N are provided, where each is coupled to provide a resistor voltage of a respective one of the resistors 124 to the second input of the hysteretic comparator circuit 112. As shown in the embodiment of FIG. 1, the sampling circuit 120 may be a simple solid state switch under the control of signals provided by the timing logic 132 and derived from the pulse width modulated CO signal. As an alternative to using a switch, the sampling circuit 120 may feature a type of continuous sampling scheme where the resistor voltage is made continuously available to the hysteretic comparator circuit 112. In both cases, the hysteretic comparator circuit in effect responds to a measured current in each phase, by sensing the voltage across each sense resistor sequentially, and providing the result of each comparison at a two state output. This sequential comparison scheme allows a single comparator circuit to be used for greater efficiency in circuitry. However, as an alternative to using a single comparator circuit that feeds timing logic 132, multiple comparator circuits may be provided to perform one or more of the comparisons in parallel depending on the number of phases. The circuit implementation of the sampling circuit 120 in each phase of the regulator should be substantially identical, so that the sense resistor voltages are sampled consistently among the different phases. This helps insure a more precise control of the equal distribution of the output current among the different phases.

Figure 2:
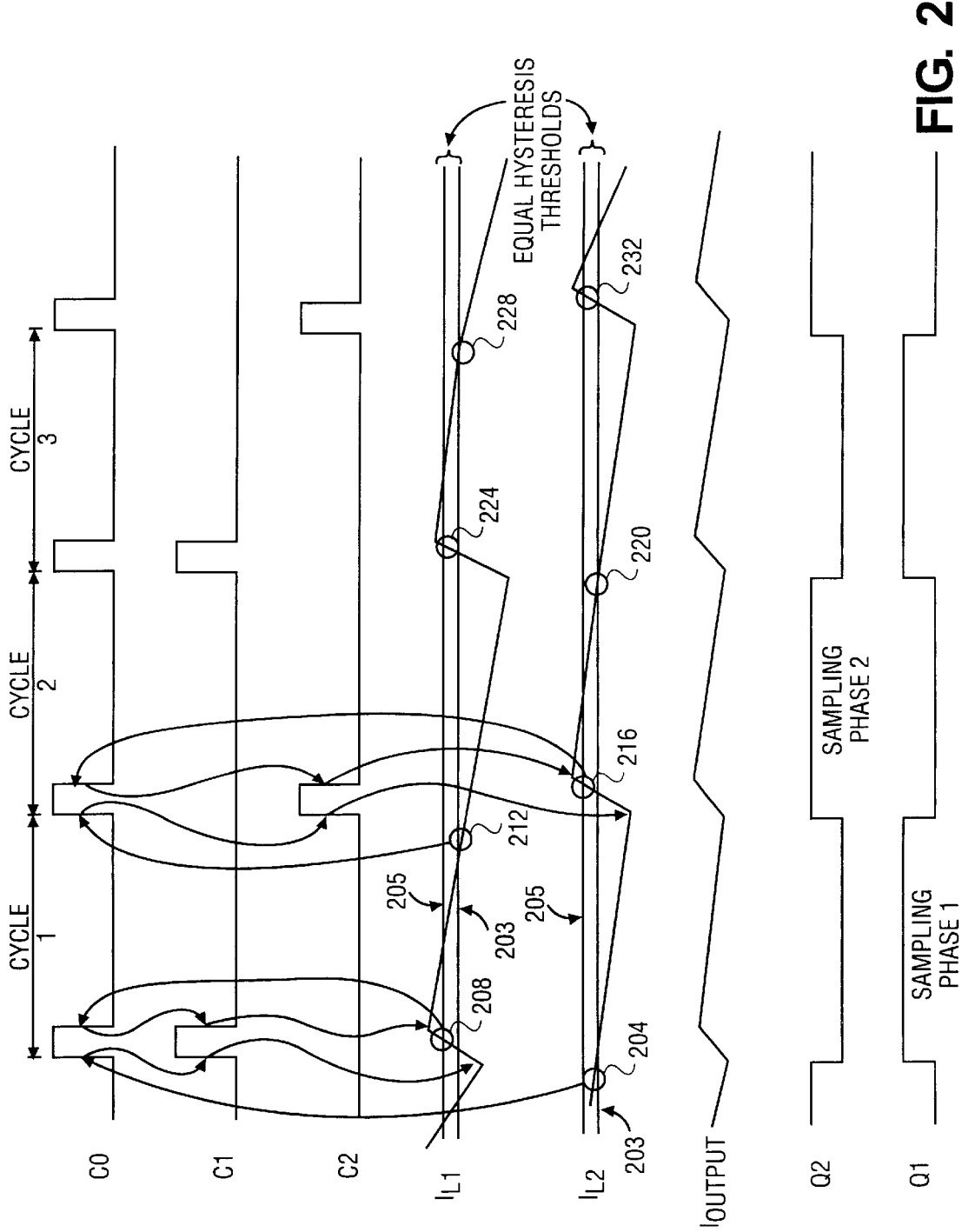
FIG. 2 depicts a number of waveforms that can be obtained from running the switching regulator.

The following waveforms are illustrated in FIG. 2: CO (a pulse width modulated signal provided by the hysteretic comparator circuit 112), C1 and C2 (pulse width modulated control signals derived from CO and provided to control the activation and deactivation of their respective switchable power circuit 108), $I_{L1}$ and $I_{L2}$ (inductor current in the respective phase), $I_{output}$ (output current at the common node 116, where the output current in this embodiment is the sum of $I_{L1}$ and $I_{L2}$), and Q1 and Q2 (control signals that define the sampling interval for $I_{L1}$ in phase 1 and $I_{L2}$ in phase 2, respectively). The switching regulator is a closed loop control system that will reach a stable, steady state condition in which a pulse width modulated CO signal is generated as follows. Assume that we are in cycle 1, a sampling interval in which Q2 is asserted, such that the hysteretic comparator circuit is in effect monitoring the current $I_{L2}$. Also, assume in this case that $I_{L2}$ is falling as shown in FIG. 2, so that an event 204 is reached where $I_{L2}$ has fallen just enough below the lower hysteresis threshold 203 so as to change the state of the output of the comparator. This change in state is represented by the low to high transition in CO. When CO is asserted in this cycle, this results in C1 being asserted which in turn results in the activation of the switchable power circuit in phase 1. This activation in turn causes the current $I_{L1}$ in phase 1 to rise as indicated. In other words, when the current in phase 1 has reached the lower hysteresis threshold 203, another phase (here, phase 1) is activated.

Proceeding now to event 208, this is an event in which the current in phase 1 ($I_{L1}$) rises to just above the upper threshold. This event is detected because the hysteretic comparator circuit is now monitoring the current in phase 1 (corresponding to Q1 being asserted). When the current in phase 1 just passes the upper hysteresis threshold 205, the output of the hysteretic comparator is again toggled which corresponds to the CO signal being deasserted as shown. This will in turn cause the C1 signal to also be deasserted, thereby deactivating phase 1 and thereby causing its current to fall.

After event 208 has been detected, the comparator circuit will continue to monitor the current in phase 1 until the current drops to just be low the lower hysteresis threshold 203 at event 212. Similar to event 204, the event 212 will cause CO to be asserted. This time, however, the assertion of CO does not affect C1, but rather results in C2 being asserted, indicating the start of the next cycle. Since C2 has been asserted, phase 2 is now activated such that $I_{L2}$ will now rise.

After event 212 has been detected, the comparator circuit reverts back to monitoring the current in phase 2 where the next event to be detected is event 216. This event ours when $I_{L2}$ has risen to just above the upper hysteresis threshold 205 which in turn causes the comparator output to toggle and thereby deassert CO. This in turn results in C2 being deasserted which deactivates phase 2, as evidenced by the fall in $I_{L2}$. It can be seen that the above described events 204–216 are repeated for subsequent pairs of cycles of CO, as indicated by events 220–232, and so on.

An advantageous effect of having equal hysteresis thresholds when monitoring both $I_{L1}$ and $I_{L1}$ is that the control of the activation and deactivation of each phase is the same, such that the average value of $I_{L1}$ will be the same as the average value of $I_{L2}$ in the steady state. This in turn means that the average of $I_{output}$ is equal to twice the average of either $I_{L1}$ or $I_{L2}$. This equal current sharing effect is achieved using a very efficient circuit as shown in FIG. 1, where the current in each phase is monitored by sampling the resistor voltage of each phase sequentially, and comparing the resistor voltage with the voltage of the common node 116 to obtain a measure of the current in that phase.

Figure 3:
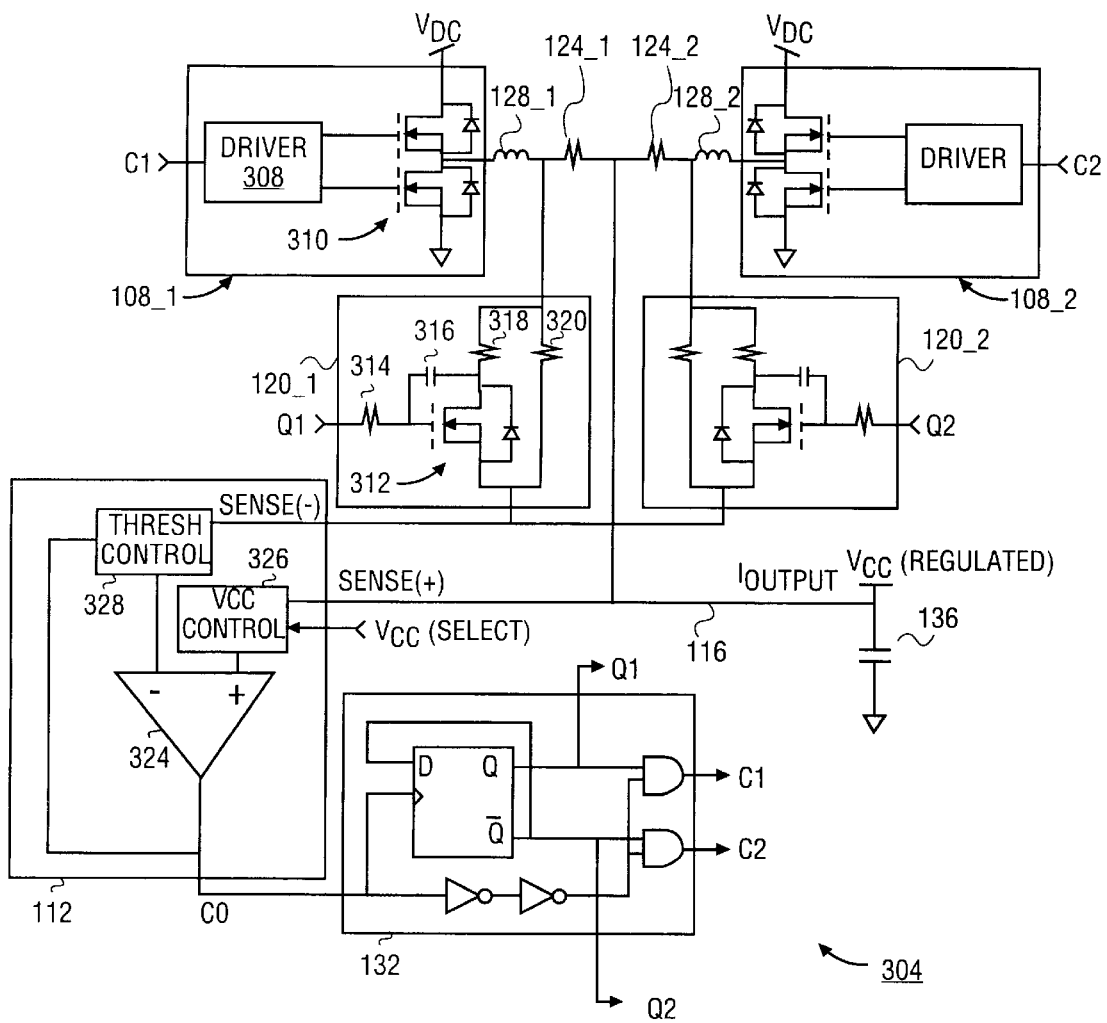
FIG. 3 illustrates a circuit schematic of a switching regulator according to another embodiment of the invention.

Turning now to FIG. 3, another embodiment 304 of the switching regulator is illustrated by a schematic diagram. Exemplary circuit implementations for the switchable power circuit 108, sampling circuit 120, hysteretic comparator circuit 112, and timing logic 132 are shown. The embodiment 304 is a two phase switching regulator having two switchable power circuits 108_1 and 108_2. In this embodiment, each switchable power circuit 108 has a pair of N channel metal oxide semiconductor field effect transistors (MOSFETs) 310 which are controlled by a driver 308 to activate and deactivate an inductive element 128. When the input control signal C1 is asserted, the driver 308 controls the gates of the N channel MOSFETs such that the lower transistor is cut off whereas the upper transistor is strongly inverted (thereby "turned on"). This causes current to be sourced from the supply node, at a voltage called $V_{dc}$, into the inductor 128, thereby causing the inductor current to rise. When C1 is deasserted, the driver 308 will drive the gates of the N channel transistors to opposite levels such that the upper transistor is cut off while the lower transistor is turned on. This deactivation causes the current through the inductive element 128 to fall. It should be noted that as an alternative to switching the lower N channel transistor on and off, a fixed diode may be provided instead as a circuit-wise simpler alternative. However, doing so may increase power dissipation in the switchable power circuit 108 as well as reduce the rate at which the current in the inductor 128 falls. The switchable power circuit 108_2 in the other phase of the switching regulator may be identical to 108_1 in the first phase.

Each of the exemplary sampling circuits 120 shown in FIG. 3 uses a switching N channel MOSFET 312 with a series drain resistor 318 and a parallel resistor 320. The latter sets the baseline for current sharing, i.e. the 'neighborhood', while the former fine tunes the current sharing thresholds, i.e. the 'particular house' in the neighborhood. The resistor capacitor combination 314 and 316 connected to the gate and drain of the transistor 312 provide a soft switching action to prevent injected noise from coupling in from the parasitic gate capacitance inside the MOSFET 312. Thus, a type of filtering and attenuation effect is obtained by the embodiment of the sampling circuit 120 shown in FIG. 3 where the actual voltage of the sense resistor is intentionally underestimated as it is provided to the sense (−) input of the hysteretic comparator circuit 112. This is a desirable effect because it has a tendency to stabilize the closed loop control of the current in each phase of the regulator. Other circuit implementations that can provide such a filtering and intentional underestimation effect upon the voltage of the sense resistor as provided to the hysteretic comparator circuit 112 may be developed by those of ordinary skill in the art.

Figure 4:
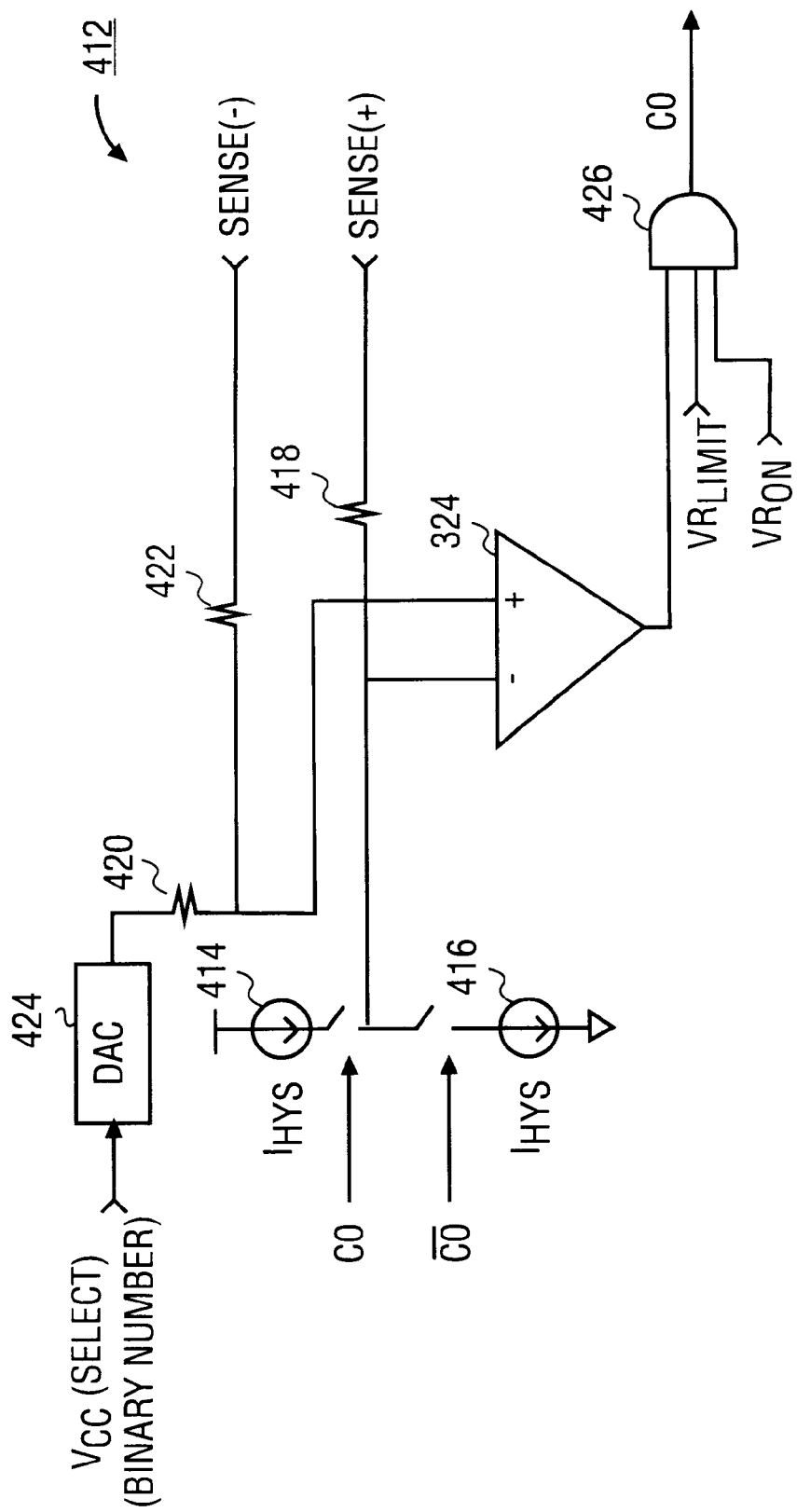
FIG. 4 depicts a schematic of a hysteretic comparator circuit for use in the switching regulator.

The version of the hysteretic comparator circuit 112 shown in FIG. 3 features a comparator 324 having a first input (−) to which hysteresis thresholds are applied by a threshold control circuit 328, and a second input (+) which continuously receives a voltage from a $V_{cc}$ control circuit 326 that helps set the regulated output voltage of the common node 116. The threshold control circuit 328 at its output provides a lower threshold voltage if the output of the comparator 324 was last toggled in response to the non-inverting (+) input being at a lower voltage than the inverting input (−). When the comparator 324 is toggled in response to the non-inverting input voltage rising above the inverting input, the threshold control circuit 328 changes its output to an upper hysteresis threshold voltage. One of ordinary skill in the art given this description will recognize how to design the actual circuitry to implement the output functionality of the threshold control circuit 328. For instance, FIG. 4 shows a schematic of an embodiment 412 of the hysteretic comparator circuit 112 in which a pair of current sources 414 and 416 are alternatively connected to the inverting (−) input of the comparator 324 as a function of the CO signal, to provide the upper and lower threshold voltages as a function of the coupling resistor 418. To further control the output voltage $V_{cc(reg.)}$ as well as the output current $I_{output}$, a voltage divider that features resistors 420 and 422 being biased according to $V_{cc(select)}$ which, in this embodiment, is a binary number converted by a digital to analog converter (DAC) 424, are provided as shown. The resistance values of 418, 420, and 422 may be selected based on a simulation of the entire switching regulator, such that the desired dc voltage, $V_{cc(reg.)}$, is obtained for a given range of load currents drawn from the common node 116.

It should be noted that the design of the hysteretic comparator circuit 112 is not limited to that shown in FIG. 3 or FIG. 4. For instance, an alternative would be to use a threshold control circuit that would apply the different hysteresis thresholds to the inverting input (−) of the comparator 324, while the non-inverting input (+) would continuously receive the voltage that is based on the common node 116. Such a reversal in polarity should be taken into account when designing the timing logic 132 so that the control signals C1, C2, Q1, and Q2 are correctly asserted to achieve the desired results of controlling the respective switchable power circuits 108 and sampling circuits 120.

The version of the timing logic 132 shown in FIG. 3 is a relatively efficient logic gate and flip flop structure that generates the C1, C2, Q1, and Q2 control signals such that each of the control signals is asserted during a different time interval (see FIG. 2). Thus, C1 and C2 are asserted in different cycles of CO. Similarly, Q1 and Q2 are asserted in different cycles of CO. One of ordinary skill in the art will recognize t hat other logic structures may be designed to obtain the waveforms shown in FIG. 2.

Figure 5:
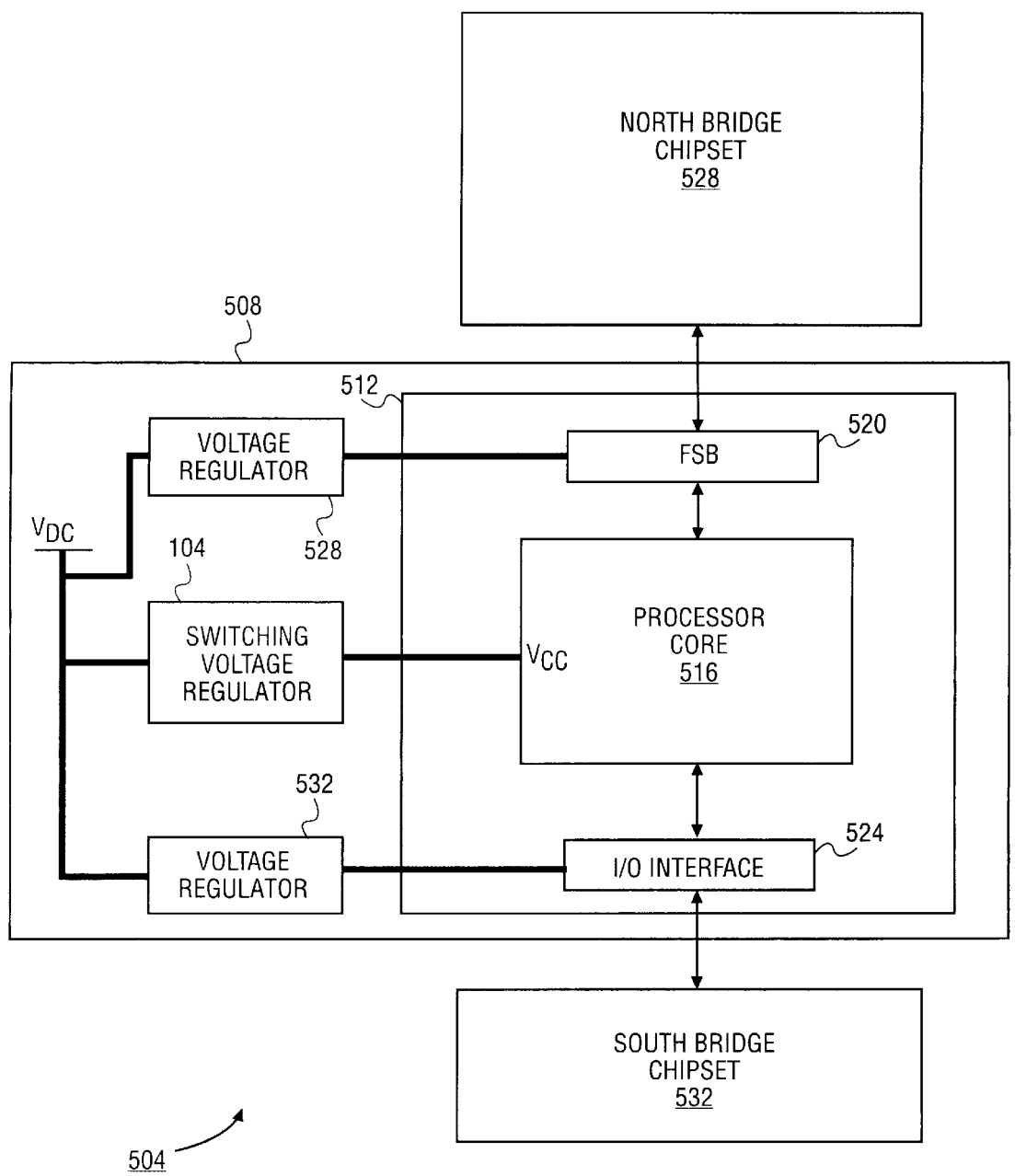
FIG. 5 shows a block diagram of part of a computer system motherboard featuring an application of the switching regulator.

Referring now to FIG. 5, an application of the switching voltage regulator 104 is shown as part of an electronic system 504. The system 504 features a microprocessor module 508 and associated chipset 528 or 532 that is to be installed on-board a printed wiring board (PWB) that is adapted to inter connect the microprocessor module and the associated chipset. The details of the PWB are not shown but would be readily apparent to one of ordinary skill in the art. The PWB and in particular the microprocessor module 508 provides a power supply line 511 that is intended to supply main power to a processor core 516. The switching voltage regulator 104 m ay be aboard the microprocessor module 508 and thus installed on-board the PWB. The regulator is thus coupled to provide a regulated dc voltage on the power supply line 511. Power to the switching regulator 104 is supplied by a generally unregulated dc supply node (providing a voltage $V_{dc}$). In those embodiments in w which the microprocessor 512 is include d together with the PWB, the e microprocessor 512 may be one that features a front side bus 520 and an input/output (I/O) interface 524 that are coupled to communicate with a processor core 516. In some embodiments, the front side bus (FSB) 520 is coupled to a north bridge chip set 528. The FSB 520 allows communication between the north bridge chipset 528 and the processor core 516. In the embodiment shown in FIG. 5, the FSB 520 has a separate power supply line that receives a regulated voltage from a voltage regulator 528. Similarly, the I/O interface 524 also has a separate power supply line that receives a regulated dc voltage from a voltage regulator 532. There are other variations to this topology of using separate voltage regulators to supply the power needed by other functional unit blocks of the microprocessor 512.

To summarize, various embodiments of the invention have been described that are directed to a switching regulator design that promotes equal current sharing among its phases, without requiring complex circuitry to control the currents. In the foregoing specification, the invention has been described with reference to specific exemplary embodiments thereof. It will, however, be evident that various modifications and changes may be made thereto without departing from the broader spirit and scope of the invention as set forth in the appended claims. For instance, referring to FIG. 4, the output of the comparator 324 which defines the transitions in the CO signal may be qualified using an AND gate 426 by additional digital control signals such as $VR_{ON}$ can be used as a regulator output enable signal and $V_{limit}$ to limit the output current. The specification and drawings are, accordingly, to be regarded in an illustrative rather than a restrictive sense.

What is claimed is:

1. A switching regulator comprising:
   a plurality of switchable power circuits;
   a plurality of inductive elements each in series with a respective one of the plurality of switchable power circuits;
   a plurality of resistors each being in series between a respective one of the plurality of inductive elements and a common node;

a hysteretic comparator circuit having a first input coupled to the common node and an output coupled to control the plurality of switchable power circuits; and a plurality of sampling circuits each being coupled to provide a resistor voltage of a respective one of the plurality of resistors as input to the hysteretic comparator circuit, wherein the hysteretic comparator circuit responds to each pair of resistor and common node voltages using the same hysteresis thresholds.

2. The switching regulator of claim 1 wherein the hysteretic comparator circuit has a second input coupled to each of the plurality of sampling circuits.

3. The switching regulator of claim 1 further comprising:

timing circuitry coupled between the hysteretic comparator circuit output and the plurality of switchable power circuits, to generate a separate control signal for each of the plurality of switchable power circuits, each control signal to be asserted during a different time interval.

4. The switching regulator of claim 2 wherein each sampling circuit includes a switch circuit having an input coupled to a respective one of the plurality of resistors and an output coupled to the second input of the hysteretic comparator circuit.

5. The switching regulator of claim 4 wherein the sampling circuit provides a filtering effect on operation of the switch circuit.

6. The switching regulator of claim 1 wherein the hysteretic comparator circuit includes a comparator having a first input to which hysteresis thresholds are applied and a second input which continuously receives the common node voltage.

7. A switching regulator comprising:

a plurality of means for selectively sourcing current from a dc supply node;

means for combining the plurality of sourced currents to yield an output current through a common node; and means for distributing the output current equally through the plurality of sourcing current means, the distribution means having means for hysteretically comparing a voltage of a separate node in each sourcing current means to a voltage of the common node, according to the same hysteresis thresholds, and in response controlling the plurality of sourcing current means.

8. The switching regulator of claim 7 wherein the distribution means includes a plurality of means each for sampling the voltage of the separate node in each sourcing current means.

9. The switching regulator of claim 8 wherein the distribution means includes means for timing the sampling means in response to an output of the comparison means, so that the comparison means sequentially compares the voltage of the separate node in each sourcing current means to the common node voltage.

10. A method for regulating a dc voltage, comprising:

activating and de-activating each of a plurality of phases of a switching regulator, an output current being defined at a common node as a sum of a plurality of phase current in the plurality of phases, each phase having a switchable power circuit in series with an inductive element and a resistor, the resistor being in series between the inductive element and the common node; and distributing the output current equally among the plurality of phases, by hysteretically comparing a voltage of each resistor to a voltage of the common node using the same hysteresis thresholds and, in response, controlling the activating and de-activating of the plurality of phases.

11. The method of claim 10 wherein the equal distribution of the output current includes sampling and comparing the voltage of each resistor to the common node voltage in a separate cycle of a pulse width modulated signal, said comparing generates the pulse width modulated signal.

12. The method of claim 11 wherein the sampling further includes attenuating the voltage of each resistor before comparing to the common node voltage, so that the pulse width modulated signal does not overcompensate for an increase in the output current.

13. An electronic system comprising:

printed wiring board (PWB) adapted to interconnect a microprocessor and an associated chipset to be installed on-board, the PWB provides a power supply line intended for a processor core of the microprocessor; and a switching voltage regulator installed on-board the PWB, the regulator being coupled to provide a regulated dc voltage on the power supply line, the regulator having a plurality of switchable power circuits, a plurality of resistors each being in series between a respective one of the plurality of switchable power circuits and a common node, a hysteretic comparator circuit having a first input coupled to the common node and an output coupled to control the plurality of switchable power circuits, and a plurality of sampling circuits each being coupled to provide a resistor voltage of a respective one of the plurality of resistors to a second input of the hysteretic comparator circuit, wherein the hysteretic comparator circuit responds to each pair of resistor and common node voltages using the same hysteresis thresholds.

14. The electronic system of claim 13 in combination with the microprocessor.

15. The electronic system of claim 14 wherein the microprocessor further includes a front side bus and an input/output (I/O) interface coupled to communicate with the processor core.

16. The electronic system of claim 15 in combination with the chipset being a north bridge chipset that is coupled to communicate with the processor core through the front side bus.

17. The electronic system of claim 16 in combination with the chipset being a south bridge chipset that is coupled to communicate with the processor core through the I/O interface.

* * * * *

UNITED STATES PATENT AND TRADEMARK OFFICE
CERTIFICATE OF CORRECTION

PATENT NO.      : 6,366,069 B1
DATED           : April 2, 2002
INVENTOR(S)     : Nguyen et al.

It is certified that error appears in the above-identified patent and that said Letters Patent is hereby corrected as shown below:

Column 4,
Line 21, delete "ours" and insert -- occurs --.

Column 6,
Line 8, delete "t hat" and insert -- that --.
Line 26, delete "in w which" and insert -- in which --.
Line 27, delete "include d together" and insert -- included together --.
Line 28, delete "the e microprocessors" and insert -- the microprocessors --.

Signed and Sealed this

Third day of September, 2002

Attest:

JAMES E. ROGAN
Attesting Officer       Director of the United States Patent and Trademark Office